(12) United States Patent
Haggerty et al.

(10) Patent No.: US 7,046,897 B2
(45) Date of Patent: May 16, 2006

(54) LIGHT BEAM PREPARATION ARRANGEMENT

(75) Inventors: Joe Haggerty, Shanghai (CN); Steffen Capello, Arvada, CO (US); Anton Hafner, Gisingen (AT); Claus Heine-Kempkens, Chur (CH); Reinhard Sperger, Feldkirch (AT); Jorge Darr, Arvada, CO (US)

(73) Assignee: Unaxis Balzers Ltd., Balzers (LI)

( * ) Notice: Subject to any disclaimer, the term of this patent is extended or adjusted under 35 U.S.C. 154(b) by 93 days.

(21) Appl. No.: 10/459,077

(22) Filed: Jun. 11, 2003

(65) Prior Publication Data

US 2004/0036967 A1 Feb. 26, 2004

Related U.S. Application Data

(60) Provisional application No. 60/388,580, filed on Jun. 13, 2002.

(51) Int. Cl.
*G02B 6/00* (2006.01)
*G03B 21/14* (2006.01)
*G03B 21/56* (2006.01)
*F21V 7/04* (2006.01)

(52) U.S. Cl. ........................ 385/133; 385/901; 385/52; 353/84; 359/443; 362/362; 362/368; 362/551; 362/552; 362/581

(58) Field of Classification Search ................ 385/901, 385/146, 116, 115, 133, 52; 353/84, 31, 353/81, 98; 359/443; 362/362, 368, 551, 362/552, 581
See application file for complete search history.

(56) References Cited

U.S. PATENT DOCUMENTS

| | | | |
|---|---|---|---|
| 4,560,252 A | 12/1985 | Mori | 350/315 |
| 5,121,158 A | 6/1992 | Chen et al. | 355/35 |
| 5,426,474 A | 6/1995 | Rubtsov et al. | 362/32 |
| 5,448,314 A | 9/1995 | Heimbuch et al. | 348/743 |
| 5,625,738 A | 4/1997 | Magarill | 385/146 |
| 6,005,722 A | 12/1999 | Butterworth et al. | 359/712 |
| 6,155,687 A * | 12/2000 | Peterson | 353/84 |
| 6,419,365 B1 * | 7/2002 | Potekev et al. | 353/98 |
| 6,474,818 B1 * | 11/2002 | Engle | 353/84 |
| 6,481,855 B1 * | 11/2002 | Oehler | 353/70 |
| 6,769,776 B1 * | 8/2004 | Chen et al. | 353/84 |
| 6,883,937 B1 * | 4/2005 | Vastola et al. | 362/293 |
| 2001/0035941 A1 * | 11/2001 | Peterson et al. | 353/98 |
| 2002/0005914 A1 | 1/2002 | Tew | 348/743 |
| 2004/0036967 A1 * | 2/2004 | Haggerty et al. | 359/443 |

* cited by examiner

*Primary Examiner*—Brian M. Healy
(74) *Attorney, Agent, or Firm*—Pearne & Gordon LLP (57) ABSTRACT

A light beam preparation arrangement includes a light tunnel, a rotatable unit, and a drive unit. In one aspect, a fixation rigidly attaches the light tunnel directly to the drive unit. In another aspect, temperature of the light tunnel in controlled. In another aspect, the rotatable unit is spaced a distance from the light tunnel, and the distance is controlled. In another aspect, alignment between the light tunnel and the rotatable unit is controlled. In another apsect, the light tunnel is hollow and a gas flows though the tunnel.

53 Claims, 4 Drawing Sheets

LIGHT BEAM PREPARATION ARRANGEMENT

RELATED APPLICATION

Benefit of priority is hereby claimed from prior U.S. Provisional Patent Application Ser. No. 60/388,580, filed Jun. 13, 2002.

FIELD OF THE INVENTION

The present invention relates to a beam preparation arrangement for use within an illumination system, such as an image projection system, and the present invention particularly relates to a beam preparation arrangement that provides color-sequential and color-recapturing illumination of a light valve with additional light recovery means within the illumination system.

BACKGROUND OF THE INVENTION

In one type of projection system, a light valves is illuminated with an illumination beam that is at least approximately homogeneous across the active area of the light valve. For example, U.S. Pat. No. 5,625,738 describes a light tunnel for beam shaping and homogenization. Multi-reflections at the inner surfaces of the light tunnel, which are covered with a high reflection coating, provide an intensity distribution of the light that is approximately homogeneous at the exit of the light tunnel. In addition, the light tunnel transforms the illumination beam from a circular shape at the entrance of the light tunnel to a rectangular shape at the exit of the light tunnel.

Projectors based on color-sequential image formation only have one light valve, and the color-sequential beam is directed upon the single light valve. U.S. Pat. No. 5,448,314 discloses a method of field sequential colored illumination of a light valve used for projection. Within the method, light from a white light source is propagated through a transmitting periphery of a color wheel. The periphery includes a plurality of different color filters. Therefore, different colors are sequentially transmitted when the color wheel is rotated. The light valve is driven in such a way, that the actual image, formed by the light valve, corresponds to the actual transmitted color of the light used for illumination. If the color wheel is rotated fast enough and the light valve is accordingly switched fast enough, the human eye is not able to resolve the different images on the screen and the impression of a colored image is achieved.

Figure 1:
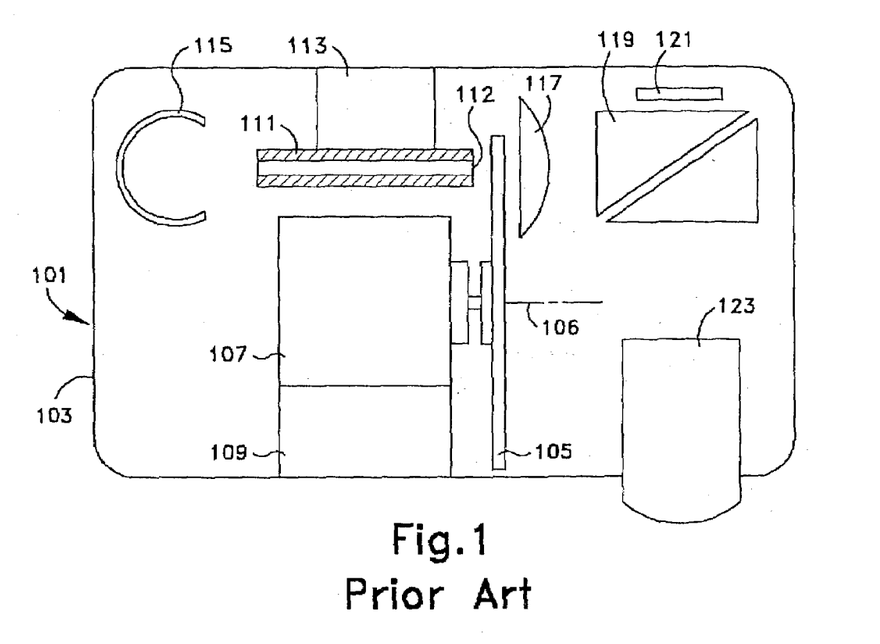
FIG. 1 is a schematic, top view of a known single panel projector.

FIG. 1 shows a known projector 101 that has a light tunnel 111 and that utilizes the field sequential colored illumination method. A white light source 115 (e.g., light emission component and reflector) emits light downstream within the projector 101 toward the light tunnel 111. In general, the progression of the light is referred to as a stream path. The light is focused down to a beam for entrance into the light tunnel 111. As the light beam is transmitted through the light tunnel 111, the light beam is transformed to have an intensity distribution that is at least approximately homogeneous. The shape of the light beam is adapted to the shape (e.g., rectangular) of an active area of a light valve 121, which is located further downstream.

The rectangular-shaped and homogeneous light beam, which exits the light tunnel 111, impinges on a color wheel 105. A plurality of color filters is provided on the color wheel 105, and each filter transmits a different wavelength range. Thus, the color wheel 105 transmits a predetermined wavelength interval, dependent on where the light beam impinges on the color wheel 105. Light that is not transmitted through the color wheel is reflected. The color wheel 105 is mounted on the axis 106 of a rotational motor 107. As the color wheel 105 rotates, different colors are sequentially transmitted.

As the light beam proceeds from the color wheel 105, the light beam is well prepared for being used as an input to the light valve 121, which is operated for field sequential colored illumination. A lens 117 is located downstream of the color wheel 105 and is used for imaging the exit 112 of the light tunnel 111 or the color pattern off a SCR technology based CW on the active area of the light valve 121. A prism construction 119 is interposed between the lens 117 and the light valve 121 to reflect the light beam to the light valve 121.

The light from the beam that is used for image formation is reflected by the light valve 121 in such a way that it is transmitted back through the prism 119. This transmitted light is propagating to a projection lens 123, which in turn projects the image on a screen (not shown). Light that is not used for image formation is reflected by the light valve 121 in such a way, that it is not propagated to the projection lens 123.

As shown in FIG. 1, the light tunnel 111 and the color wheel 105 are mounted separately to a housing 103 of the projector 101, independent from each other. Specifically, a fixation 109 for the motor 107, which rotationally supports the color wheel 105, is a different component than the fixation 113 for the light tunnel. In fact, the fixation 113 for the light tunnel 111 is well separated from the fixation 109 for the motor 107. However, for optical reasons, it is advantageous and in some applications important to place the entrance or the exit of the light tunnel 111 as close as possible to the color wheel 105.

Installation of the light tunnel 111 in the projector 101 requires a first set of accurate and therefore expensive adjustment procedures. Installation of the color wheel 105 in the projector 101 requires a second, different set of accurate and expensive adjustment procedures. If the housing 103 of the projector 101 changes, both adjustment procedures often have to be adopted to the new layout. Due to market requirements, such changes to the housing 103 happen quite often. Projectors for business applications or for consumer applications need to be small. One reason for the need to be small is that the small size of the projectors is one of the key selling factors. Such, small size complicates the assembly and adjustment of the light tunnel 111 independent from the color wheel 105.

SUMMARY OF THE INVENTION

In accordance with one aspect, the present invention provides a light beam preparation arrangement for preparing a light beam as the beam proceeds along a stream path from a source toward utilization. The arrangement includes a light tunnel, downstream of the source, receiving the light beam at an input end of the tunnel and transforming the light beam to have a desired intensity distribution at an output end of the tunnel. The arrangement includes a rotatable unit, in the light stream path with the beam impinging thereon, having a plurality of portions, each portion having a different optical characteristic. The arrangement includes a drive unit rotating the rotatable unit. The arrangement includes a fixation rigidly attaching the light tunnel directly to the drive unit.

In accordance with another aspect, the present invention provides a light beam preparation arrangement for preparing a light beam as the beam proceeds along a stream path from a source toward utilization. A light tunnel, downstream of the source, receives the light beam at an input end of the tunnel and transforms the light beam to have a desired intensity distribution at an output end of the tunnel. A rotatable unit, in the light stream path with the beam impinging thereon, has a plurality of portions with each portion having a different optical characteristic. A drive unit rotates the rotatable unit. Means controls temperature of the light tunnel.

In accordance with another aspect, the present invention provides a light beam preparation arrangement for preparing a light beam as the beam proceeds along a stream path from a source toward utilization. A light tunnel, downstream of the source, receives the light beam at an input end of the tunnel and transforms the light beam to have a desired intensity distribution at an output end of the tunnel. A rotatable unit, in the light stream path with the beam impinging thereon, has a plurality of portions with each portion having a different optical characteristic. The rotatable unit is spaced a distance from the second end of the light tunnel. A drive unit rotates the rotatable unit. Means controls the distance between the second end of the light tunnel and the rotatable unit.

In accordance with yet another aspect, the present invention provides a light beam preparation arrangement for preparing a light beam as the beam proceeds along a stream path from a source toward utilization. A light tunnel, downstream of the source, receives the light beam at an input end of the tunnel and transforms the light beam to have a desired intensity distribution at an output end of the tunnel. A rotatable unit, in the light stream path with the beam impinging thereon, has a plurality of portions with each portion having a different optical characteristic. The rotatable unit is spaced a distance from the second end of the light tunnel. A drive unit rotates the rotatable unit. Means controls alignment between the light tunnel and the rotatable unit.

In accordance with still another aspect, the present invention provides a light beam preparation arrangement for preparing a light beam as the beam proceeds along a stream path from a source toward utilization. A hollow light tunnel, downstream of the source, receives the light beam at an input end of the tunnel and transforms the light beam to have a desired intensity distribution at an output end of the tunnel. A rotatable unit, in the light stream path with the beam impinging thereon, has a plurality of portions with each portion having a different optical characteristic. A drive unit rotates the rotatable unit. A gas flows though the light tunnel.

BRIEF DESCRIPTION OF THE DRAWINGS

The foregoing and other features and advantages of the present invention will become apparent to those skilled in the art to which the present invention relates upon reading the following description with reference to the accompanying drawings wherein:

FIG. 2a is a schematic, side view of a recovery light tunnel and part of a spiral color wheel utilized in at least one embodiment in accordance with the present invention, FIG. 2b is a view taken along line 2b—2b of FIG. 2a;

DESCRIPTION OF EXAMPLE EMBODIMENTS

The present invention is directed to a light beam preparation arrangement that is usable within an illumination system, such as an image projection system. Hereinafter, the term projector is used herein to refer to an illumination system and is to be interpreted broadly. Because the present invention is usable is such a projector, the present invention has some similarities to some of the structure shown in FIG. 1. Also, the present invention is usable, in one example, within a projector having structure similar to the projector shown in FIG. 1. It is to be appreciated that the some similar structural features may be present within or associated with one or more embodiments of the present invention, and associated descriptions provided for FIG. 1 may be applicable to the present invention. For example, FIG. 1 illustrates a projector system that has components that may be used in conjunction with one or more embodiments of the present invention. However, it is to be appreciated that the present invention is not limited to the structural features of the projector system shown in FIG. 1.

It is an objective of the present invention to overcome the difficulties that are present in the known arrangements. For example, it will be appreciated that, in accordance with one aspect, the present invention provides a light preparation arrangement that requires only one adjustment step during installation in a projector housing. As another example, it will be appreciated that, in accordance with another aspect, the present invention provides a light preparation arrangement that is stable in performance against thermal or UV-light impact during operation, even if high intensity light sources are used and long-term performance is required.

As will be appreciated, one aspect of the present invention provides a compact and readily assembled light preparation arrangement. Such an arrangement would be capable of transforming an arbitrary incoming white light beam with circular shape to a homogeneous, rectangular shaped outgoing beam with color sequential characteristics. Such a light preparation arrangement can be assembled in one step to a housing of a projector, which makes any required adjustment easy to accomplish. As will be appreciated in one embodiment of the present invention, such a light preparation arrangement can be realized by mounting or integrating the fixation for the light tunnel on the motor.

In one example, the light preparation arrangement includes a motor for a color wheel, the color wheel itself, a fixation for a light tunnel, and the light tunnel itself. During the assembly of the light tunnel to the motor, the adjustment of the light tunnel with respect to the color wheel can be finalized without the housing of the projector being involved at all. In general, adjustments outside the housing are easier to perform. For example, with the light preparation arrangement outside of the housing the arrangement is out in the open and accessible for the use of tooling. As such, there is a realistic possibility of cost effectiveness for initial production and other subsequent work. Thus, it is to be appreciated that the resulting light preparation arrangement is small and compact and can be easily incorporated in various designs of projector housings.

Another aspect of the present invention addresses heating of the light tunnel due to light propagating and reflecting in the tunnel. Almost 70% of the light propagates at least 3 times through a recovery light tunnel. The number of reflections within the light tunnel is dramatically increased and with every reflection within the recovery light tunnel some light energy will be absorbed. This applies as well for UV light entering the light tunnel. Reflecting the UV light back to the white light source is not possible since this would eventually cause damage to the lamp over the course of time. Heating of the light tunnel as well as UV absorption within the light tunnel is a general problem in the context of light tunnel applications within projectors. The present invention provides solutions to the heating. One general inventive aspect accomplishes heat control via construction/configuration improvements. Another general inventive aspect accomplishes heat control via movement of cooling fluid, such as a gas in the form of air or the like. Hereinafter, the cooling fluid is referred to as gas for ease of discussion. However, the term should be given a broad understanding.

Yet another aspect of the present invention is directed to control and stabilization of the distance between the light tunnel and the color wheel. One general inventive aspect is that the distance between the light tunnel and the color wheel is controlled and stabilized by a gas flow. Accordingly, the light tunnel and the color wheel remain aligned. Gas pressure and/or a pressure differential caused by the flowing gas is utilized. In one example, the flow establishes Bernoulli effect force at an exit of the light tunnel adjacent to the color wheel. The gas used for the Bernoulli effect can be the same gas used for cooling the light tunnel.

These broad inventive concepts are discussed below in connection with specific examples, embodiments, etc. It is to be appreciated that the specific examples are not intended to be limitations upon the broad inventive concepts.

Figures 2A, 2B:
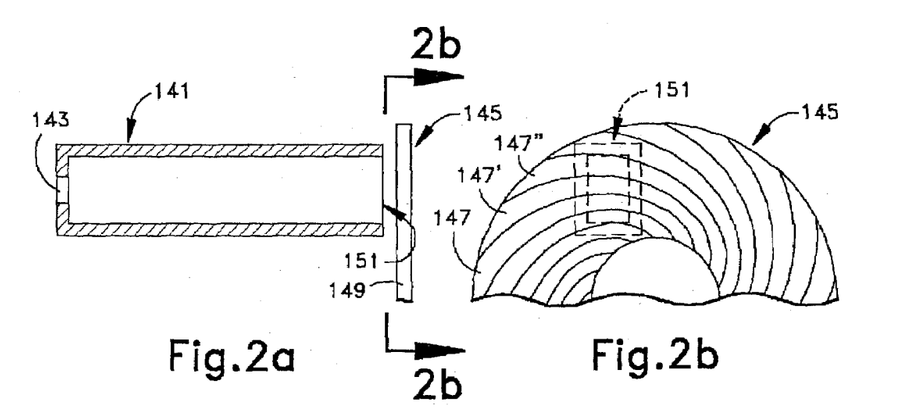

Turning now to specifics associated with examples of the present invention, FIGS. 2a and 2b show part of a light preparation arrangement for use in accordance with one aspect of the present invention, and may be utilized in a new type of single panel projector. In the example of FIGS. 2a and 2b, a light tunnel 141 and a spiral wheel 145 of an overall light preparation arrangement are shown. In this example, the light tunnel 141 is a special recovery light tunnel that includes an entrance aperture 143. The area of the aperture 143 is less than a cross-section area of the light tunnel 143 along the extent of the light tunnel.

It is to be appreciated that within the example that includes the light tunnel 141, the image formation is based on the field sequential colored illumination method, however part of the light that is reflected from the color wheel 145 is recovered. In addition the color wheel 145 is a spiral color wheel 145, which is a rotatable unit, includes a plurality of color filter stripes (e.g., 147,147', 147") that each form a spiral on the spiral wheel surface 149. However, it is to be appreciated that the color filter stripes (e.g., 147,147', 147") are just one example of different optical characteristics amoung the plurality of portions of the wheel onto which the beam impingings. Other arrangements for the wheel are contemplated.

FIG. 2b indicates, in dash lines, an overlay of a cross section of the exit 151 (FIG. 2a) of the recovery light tunnel 141 upon the color wheel 145. The overlay indicates an impingement footprint of the light beam impinging upon the color wheel 145. When the spiral color wheel 145 is rotated, the color filter stripes 147,147', 147", etc. pass along the cross section of the exit 151 of the recovery light tunnel 141. At each moment, at least three-color filter stripes (e.g., 147,147', 147") contribute to cover the cross section of the exit 151.

Light that is reflected from the spiral wheel 145 propagates back into the recovery light tunnel 141. There is a significant probability that this light is reflected at the entrance aperture 143 of the recovery light tunnel 141 and propagates a second time to the color wheel 145. The entrance aperture 143, the side walls of the recovery light tunnel 141 and the spiral wheel surface 149 need to form a cuboid, because then the angular distribution of the light impinging a second time on the spiral wheel 145 is the same as the angular distribution of the light impinging a first time on the spiral wheel 145. Therefore light is recovered without changing the angular distribution.

The preservation of the angular distribution for the recovered light is a difficult task. The alignment of the color wheel 145 with respect to the light tunnel 141 is critical and requires tight tolerances. It is very difficult to realize this alignment during the installation in the projector housing (e.g., similar to 103), and even if the alignment is realized accurately during installation, there is the possibility that during operation of the projector (e.g. similar to 101) misalignment of the color wheel 145 with respect to the light tunnel 141 is introduced due to thermal or mechanical influence.

With regard to the heating aspect, it has been discovered that heating is most prominent within the recovery light tunnel at the entrance aperture 143. According to one aspect of the present invention, the entrance aperture 143 is coated with coatings that do not include metallic layers. Such non-metallic coatings absorb less light. Such a structural feature is possible because the light to be reflected from the entrance aperture 143 is reflected under small angles (e.g., below 40°) of incidence and therefore angular and polarization dependency can be avoided without using metallic layers. Such a recovery light tunnel 141 still comprises metallic layer coatings at the sidewalls in order to reflect the light at high angles (e.g., above 60°) of incidence for both polarizations.

In one specific example, an ordinary glass material, such as borosilicate, is used with the construction of the entrance aperture 143. However, it is contemplated that a material with a higher thermal conductivity as compared to borosilicate glass can be advantageously used. In the case of such a higher thermal conductivity material, the energy absorbed will be distributed faster all over the aperture surface and temperature-gradient formation will be less prominent. This could be for example a metallic material such as aluminum or steel. As well possible is the use of a sapphire substrate that has close to 50 times higher thermal conductivity as compared to borosilicate glass. Another possibility is to use materials that have higher temperature stability (for example glass ceramics) as compared to borosilicate glass.

In another aspect of the present invention the heating problem is decreased by the use of ventilation of the light tunnel. In one general example, this heating solution is accomplished via provision of the light tunnel entrance to include a feed line for cooling gas. Associated with such a feed line of the one example is a transparent window to allow the light from the light source to enter the light tunnel. In one embodiment of the example, the normal of the window is tilted with respect to the main propagation direction of the light and is coated with a UV-reflecting filter. UV light impinging on this tilted UV-filtered window does not enter the light tunnel but is reflected. However, because of the tilt, the light is reflected away from the white light source and cannot cause any damage to the source.

As another general example, a tilted UV-filter can be used vent the light tunnel even without a feed line. Specifically, if the cooling gas is directed to the UV-filter from the appropriate side, part of the gas flow will be directed to the entrance of the light tunnel.

As yet another example, in the case of a recovery light tunnel, the entrance aperture can be separated from the rest of the light tunnel by an air gap. This air gap can be used to introduce cooling gas and therefore to vent the light tunnel effectively. Typically this gap will be chosen smaller than 1 mm in order to avoid too much light leaving the system through this gap. Despite the air gap, entrance holes, for example at the corners or entrance slits, for example along the sidewall corners can be used. All different kinds of opening geometries, preferably at the corners can be used, and even feed lines can be applied in order to vent the system.

Turning to relative position control between the light tunnel and the adjacent color wheel, in one example, the exit of the light tunnel is surrounded by at least one plate parallel to the color wheel and gas which is pumped into the light tunnel creates a flow between the plate and the color wheel. By this the Bernoulli effect is established and can be used to control the distance between the plate and the color wheel and the alignment.

Examples of these inventive concepts are described in greater detail with reference to FIGS. 3–8.

Figure 3:
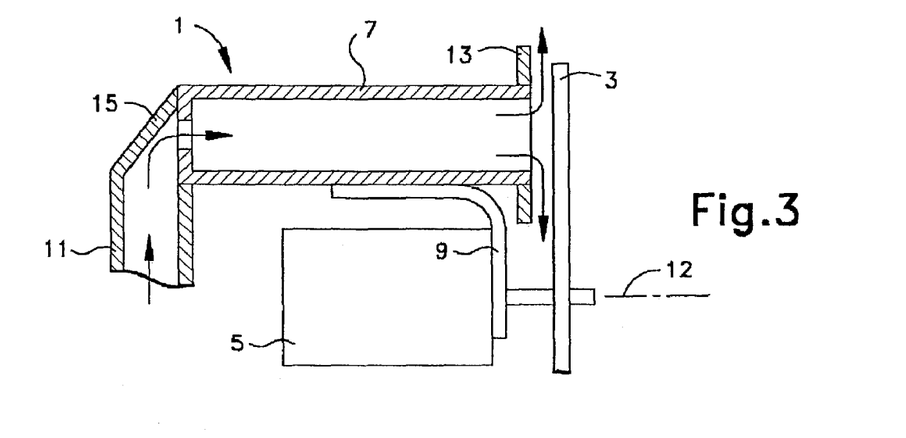
FIG. 3 is a schematic, side view of a light beam preparation arrangement that includes several aspects of the present invention.

An example light preparation arrangement 1 that includes several of the above-mentioned aspects is shown in FIG. 3. The light preparation arrangement 1 includes a color wheel 3, a motor 5, and a light tunnel 7. In the example of FIG. 3, the light tunnel 7 is a recovery light tunnel and may be similar or identical to the light tunnel 141 of FIG. 2a. In general, the light tunnel 7 (FIG. 3) is downstream of the source, receives the light beam at an input end of the tunnel, and transforms the light beam to have a desired intensity distribution at an output end of the tunnel. The color wheel 3 is rotatable and the motor 5 is a drive unit for rotating the color wheel 3. The color wheel 3 may be similar or identical to the color wheel 145 of FIG. 2a.

In the shown examples (e.g., see FIG. 2a), the color wheel 3 is located downstream of the light tunnel 141. However, the color wheel 3 may be located upstream of the light tunnel 141, and downstream of the source. As such, the color wheel 3 is in the light stream path with the beam impinging thereon. In the example where the color wheel 3 is positioned between light source and light tunnel, the color wheel could be coated in addition with a UV-filter. In addition, the color wheel 3 could be tilted in order not to reflect the UV light or the reflected visible light back to the lamp.

The light preparation arrangement 1 (FIG. 3) also includes a fixation 9 that is used to securely mount the light tunnel 7 to the motor 5. As such, the fixation 9 rigidly attaches the light tunnel 7 directly to the motor 5. In one example, the fixation 9 includes means for accurately adjusting the light tunnel 7 with respect to the mounted color wheel 3 prior to final securing. As mentioned before, this adjustment can be done outside the housing of the projector. Even automated assembly is possible since the realization of tooling for such an assembly needs not necessarily to be changed if the housing of the projector is changed. Once the light tunnel 7, the color wheel 3, and the motor 5 are assembled to form the light preparation arrangement 1, this light preparation arrangement 1 can be installed in the projector with one alignment step.

Figure 6:
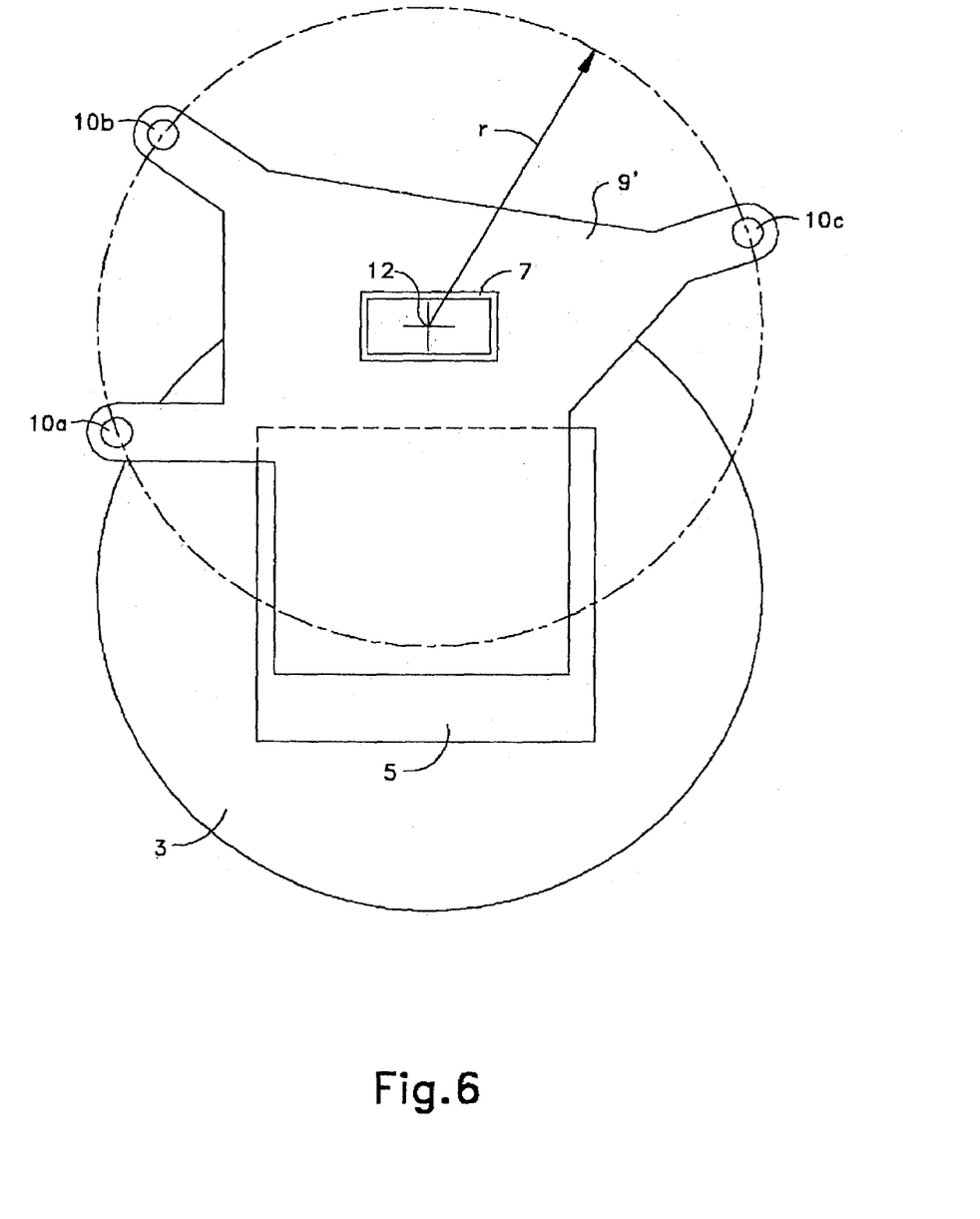
FIG. 6 is a schematic, rear view of a light beam preparation arrangement that includes at least one aspect of the present invention.

FIG. 6 shows a further enhancement concerning securing the light tunnel 7 to the motor 5 of the color wheel 3. Specifically, FIG. 6 shows that in one aspect, the fixation 9' for the light tunnel 7 to the motor 5 can be combined with the fixation of the motor to the housing of the projector. Specifically, the both the light tunnel 7 and the motor are attached to the fixation 9', and the fixation has a plurality of locations 10a–10c for attaching to the housing. Also, as another aspect, FIG. 6 shows that the light tunnel 7 has a central axis, and that fixation 9' is attached to the housing at the plurality of locations 10a–10c about the axis 12. More specifically, the plurality of attachement locations 10a–10c are each located a common radial distance r from the axis 12. As such, the central axis 12 of the light tunnel 7 is concentric within the atachement locations 10a–10c.

Turning back to the shown example of FIG. 3, the light tunnel 7 includes at least one feed line 11 for cooling gas. Through this feed line 11 cooling gas enters the light tunnel 7 at the entrance, absorbs some of the heat developed in the light tunnel 7 during operation of the projector, and leaves the light tunnel 7 at the exit of the light tunnel 7. In the FIG. 3, arrows along the extent of the feed line 11 and the light tunnel 7 indicate the gas flow for a first cooling operation mode. This is realized by pumping the cooling gas into the feed line 11. However, if a pressure below the pressure of the environment (e.g., a negative pressure or suction) is applied to the feed line 11, the gas flow is reversed and cooling is performed in a second cooling operation mode. In this second operation mode, the heated gas enters the feed line 11 for removal from the light tunnel 7. The heated gas could then be cooled (e.g., cooled back to ambient) via a means for cooling.

For cost reasons it is preferred to use air as cooling gas, however all kind different gases could be used as well. The gas used for cooling can be cooled below room temperature before entering the light tunnel 7, however even with gas at room temperature a significant cooling effect is achieved since the temperature within the light tunnel 7 during operation is significantly higher than room temperature.

In order to allow light to enter the light tunnel 7, the feed line 11 comprises a transparent entrance window 15. This entrance window 15 is preferably tilted in such a way that light reflected from this window is not propagating back to the light source. It can be antireflection coated. However, in one embodiment of the present invention, the entrance window 15 is coated with a UV reflecting coating, preferably a dielectric thin film coating. With such a UV reflecting coating, the UV component of the light is neither entering the light tunnel 7 nor propagating back to the light source.

Also as shown in the example of FIG. 3, an additional plate 13 is associated with the light tunnel 7 and the feed line 11. Specifically, the plate 13 surrounds the exit of the light tunnel 7 and is in plane with the cross section of the exit of the light tunnel 7. Although only one plate is show in the example, it is to be appreciated that the use of plural plates or other structures is contemplated.

Further in connection with the use of the plate 13, the color wheel 3 is attached to the motor 5 with some degree of freedom with respect to movement along the motor axis 17 and with respect to axial deviations. The flow of the cooling gas between the color wheel 3 and the plate 13 causes, via Bernoulli effect, an attractive force between the plate 13 and the color wheel 3. As such the distance between the light tunnel 7 and the color wheel 3 is controlled, and the light tunnel and the color wheel remain aligned. If the gas flow is operated in the first cooling operation mode, it is possible to stabilize and control the distance between the at least one plate 13 and color wheel 3 because the strength of the Bernoulli force is determined and can be controlled by the flow rate of the gas.

Figure 4:
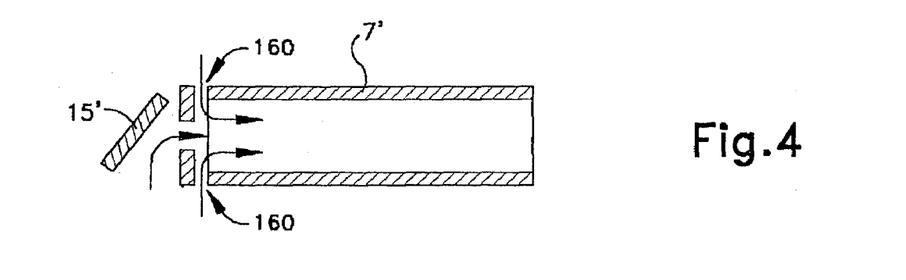
FIG. 4 is a schematic, side view of a light tunnel and associated entrance window that includes at least one aspect of the present invention.

FIG. 4 shows another example of structure that includes several of the above-mentioned aspects. Specifically, FIG. 4 shows a recovery light tunnel 7' that has an entrance end with an entrance air gap 160 for cooling purposes. Flow of the cooling gas enters the light tunnel 7' through the entrance air gap 160 as well as through the entrance aperture after being reflected from an additional window 15'. The arrows shown in FIG. 4 indicate the gas flow.

Figure 5A:
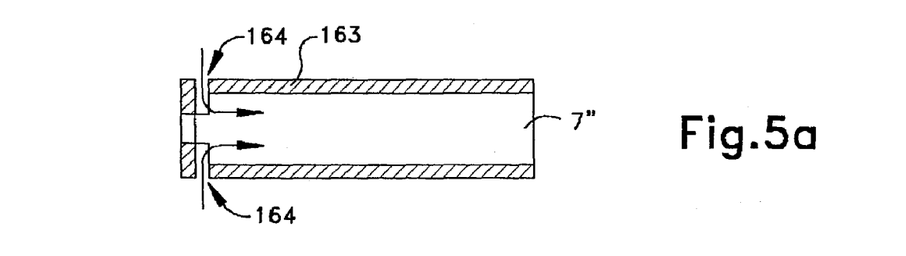
FIG. 5a is a schematic, side view of a light tunnel that includes at least one aspect of the present invention.

FIG. 5a shows a side view of a recovery light tunnel 7'' with modified light tunnel walls 163. The modification is to provide one or more additional entrance openings 164 for the cooling gas flow. These openings 164 are positioned at the corners of the tunnel 7'' in order to minimize loss of light.

Figure 5B:
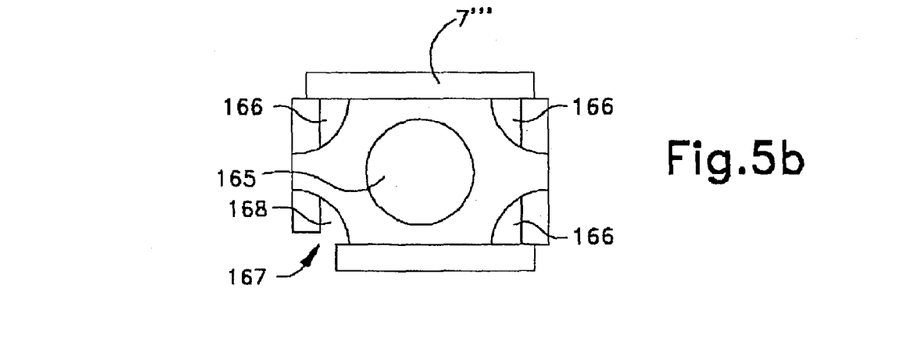
FIG. 5b is a schematic, end view of a light tunnel that includes at least one aspect of the present invention.

FIG. 5b shows an end view of a light tunnel 7''' and the associated entrance aperture 165. As can be appreciated by viewing FIG. 5b, the entrance aperture 165 is a modified entrance aperture. Specifically, the corners 167 of the structure providing the entrance aperture 165 are removed. Thus, an effect similar to that accomplished by the example of FIG. 5a is accomplished by the example of FIG. 5b.

Also, the example of FIG. 5b shows that it is possible to use a tunnel wall separation 167 in order to allow for a cooling. The two aspects of FIG. 5b could be used together or separately.

Figure 7:
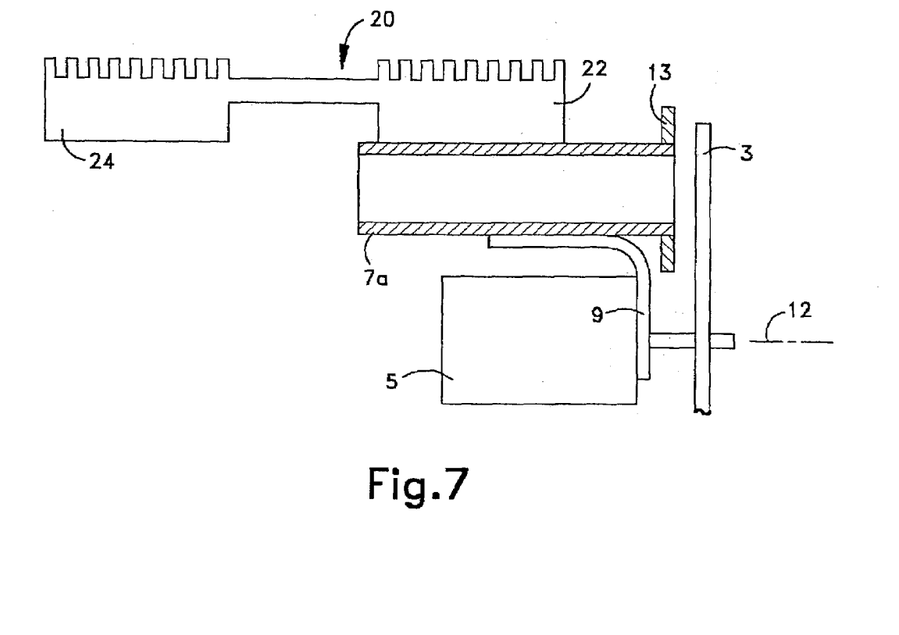
FIG. 7 is a schematic, side view of a light beam preparation arrangement that includes at least one aspect of the present invention.

Returning again to the issue of heat within the light tunnel, FIG. 7 shows another example of means for controlling temperature of a light tunnel 7a. As shown in FIG. 7, a heat pipe 20 has a first end 22 in contact with the light tunnel 7a, and a second end 24 located distal from the light tunnel. The heat pipe 20 can also be referred to as a heat sink. The heat pipe 20 is an example of the means for controlling heat that includes a thermal conveyance component in contact with the light tunnel at one portion of the thermal conveyance component for absorption of heat from the light tunnel and for transmitting the heat to another portion of the thermal conveyance component.

As mentioned before, the various examples show the various aspects of the present invention. Utilizing the present invention, beam shaping, beam homogenization and/or color preparation for illumination can be realized in a stable and/or cost efficient and/or compact way. It is to be understood that each the aspects is within the scope of the present invention, even if taken alone and not combined with some of the other aspects of the present invention.

Figure 8:
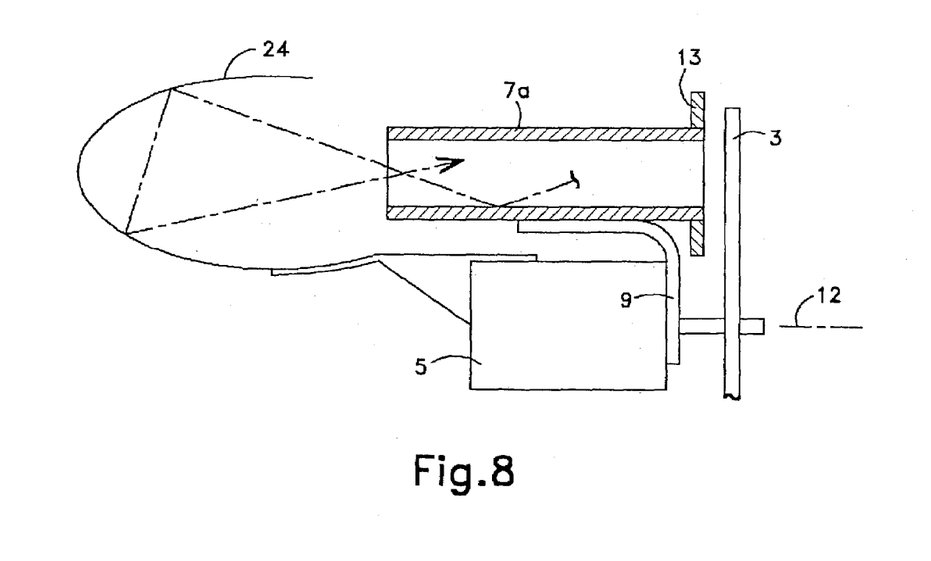
FIG. 8 is a schematic, side view of a light beam preparation arrangement that includes at least one aspect of the present invention.

It is to be appreciated that the application of beam shaping means, beam homogenization means, and color management means to one compact light preparation arrangement is inventive and not limited to projection systems nor limited to the use with color wheels. For example, the inventive aspects of the present invention may be applied to systems based on color switches. In the same sense, the inventive aspects of the present invention are not restricted to the shown hollow light tunnels. For example, FIG. 8 shows that a light tunnel 7a that does not have a reduced size aperture can be utilized. Such a light tunnel 7a can be used in conjunction with any of the above-discussed examples. This is easily understood by referring to FIG. 7, which shows such a light tunnel 7a being utilized. Still further the inventive aspects of the present invention are not restricted to hollow light tunnels at all. For example, the inventive aspects can be applied to compact integrator rods as well.

As another aspect, the light source as well could be rigidly attached to the motor 5. Such a construction provides a nice illumination unit which could be mounted outside the housing as well.

The idea of cooling light tunnels with the help of a feed line 11 at the entrance is not restricted to recovery light tunnels or to illuminations systems for projectors. It is within the scope of the present invention to cover all applications using hollow light tunnels where cooling within the tunnel turns out to be an advantage. More generally, the use of a feed line at the entrance of a light tunnel, comprising an entrance window for light is considered to be within the scope of the present invention. This is due in part because along with the invention it was realized that the gas flow within the light tunnel could be established without affecting the optical performance of the tunnel. It is to be appreciated that only two examples of how gas flow can be used have been set forth herein. It is to be appreciated that other applications of such a gas flow are possible and are within the scope of the present invention.

Also, it is to be appreciated that various other features disclosed herein are to be understood to be inventive aspects. For example, the aspect of tilting a UV filter in order to prevent the UV light reflected from propagating back to the light source and causing damage is an inventive aspect.

From the above description of the invention, those skilled in the art will perceive improvements, changes and modifications. Such improvements, changes and modifications within the skill the of the art are intended to be covered by the appended claims.

Having described the invention, the following is claimed:

1. A light beam preparation arrangement for preparing a light beam as the beam proceeds along a stream path from a source toward utilization, the arrangement including:
    a light tunnel, downstream of the source, receiving the light beam at an input end of the tunnel and transforming the light beam to have a desired intensity distribution at an output end of the tunnel;
    a rotatable unit, in the light stream path with the beam impinging thereon, having a plurality of portions, each portion having a different optical characteristic;
    a drive unit rotating the rotatable unit; and
    a fixation rigidly attaching the light tunnel directly to the drive unit.

2. An arrangement as set forth in claim 1, wherein the fixation is a first fixation, the arrangement includes a housing, and a second fixation rigidly attaching the drive unit to the housing.

3. An arrangement as set forth in claim 1, including a housing, wherein the light tunnel has an axis, and the fixation is attached to the housing at a plurality of locations about the axis.

4. An arrangement as set forth in claim 3, wherein the plurality of attachment locations are each located at a common radial distance from the axis.

5. An arrangement as set forth in claim 1, wherein the input end of the light tunnel has an aperture.

6. An arrangement as set forth in claim 1, wherein the input end of the light tunnel does not have an aperture.

7. An arrangement as set forth in claim 1, wherein the arrangement prepares the light beam for image-provision utilization.

8. An arrangement as set forth in claim 1, including means for controlling temperature of the light tunnel.

9. An arrangement as set forth in claim 8, wherein the light tunnel is hollow, and the means for controlling includes gas flow through the hollow tunnel.

10. An arrangement as set forth in claim 8, wherein the means for controlling includes a thermal conveyance component in contact with the light tunnel at one portion of the thermal conveyance component for absorption of heat from the light tunnel and for transmitting the heat to another portion of the thermal conveyance component.

11. An arrangement as set forth in claim 8, wherein the light tunnel is hollow, and the means for controlling includes a non-metallic coating within the hollow tunnel.

12. An arrangement as set forth in claim 1, wherein the rotatable unit is downstream of the light tunnel and is spaced a distance from the output end of the light tunnel, the arrangement includes means for controlling the distance between the output end of the light tunnel and the rotatable unit.

13. An arrangement as set forth in claim 12, wherein the means for controlling the distance includes a flowing gas.

14. An arrangement as set forth in claim 1, including means for controlling alignment between the light tunnel and the rotatable unit.

15. An arrangement as ser forth in claim 1, wherein the source is rigidly attached to the drive unit.

16. A light beam preparation arrangement for preparing a light beam as the beam proceeds along a stream path from a source toward utilization, the arrangement including:
   a light tunnel, downstream of the source, receiving the light beam at an input end of the tunnel and transforming the light beam to have a desired intensity distribution at an output end of the tunnel;
   a rotatable unit, downstream of the light tunnel with the beam impinging thereon, having a plurality of portions, each portion having a different optical characteristic;
   a drive unit rotating the rotatable unit; and
   means for controlling temperature of the light tunnel.

17. An arrangement as set forth in claim 16, wherein the light tunnel is hollow, and the means for controlling includes gas flow through the hollow tunnel.

18. An arrangement as set forth in claim 16, wherein the means for controlling includes a thermal conveyance component in contact with the light tunnel at one portion of the thermal conveyance component for absorption of heat from the light tunnel and for transmitting the heat to another portion of the thermal conveyance component.

19. An arrangement as set forth in claim 16, wherein the light tunnel is hollow, and the means for controlling includes a non-metalic coating within the hollow tunnel.

20. An arrangement as set forth in claim 16, including a fixation rigidly attaching the light tunnel directly to the drive unit.

21. An arrangement as set forth in claim 20, including a housing, wherein the light tunnel has an axis, and the fixation is attached to the housing at a plurality of locations about the axis.

22. An arrangement as set forth in claim 21, wherein the plurality of attachment locations are each located at a common radial distance from the axis.

23. An arrangement as set forth in claim 16, wherein the rotatable unit is downstream of the light tunnel and is spaced a distance from the output end of the light tunnel, the arrangement includes means for controlling the distance between the output end of the light tunnel and the rotatable unit.

24. An arrangement as set forth in claim 23, wherein the means for controlling the distance includes a flowing gas.

25. An arrangement as set forth in claim 16, including means for controlling alignment between the light tunnel and the rotatable unit.

26. An arrangement as set forth in claim 16, wherein the source is rigidly attached to the drive unit.

27. A light beam preparation arrangement for preparing a light beam as the beam proceeds along a stream path from a source toward utilization, the arrangement including:
   a light tunnel, downstream of the source, receiving the light beam at an input end of the tunnel and transforming the light beam to have a desired intensity distribution at an output end of the tunnel;
   a rotatable unit, in the light stream path with the beam impinging thereon, having a plurality of portions, each portion having a different optical characteristic, the rotatable unit being spaced a distance from the output end of the light tunnel;
   a drive unit rotating the rotatable unit; and
   means for controlling the distance between the output end of the light tunnel and the rotatable unit.

28. An arrangement as set forth in claim 27, wherein the means for controlling the distance includes a flowing gas.

29. An arrangement as set forth in claim 27, including a fixation rigidly attaching the light tunnel directly to the drive unit.

30. An arrangement as set forth in claim 29, including a housing, wherein the light tunnel has an axis, and the fixation is attached to the housing at a plurality of locations about the axis.

31. An arrangement as set forth in claim 30, wherein the plurality of attachment locations are each located at a common radial distance from the axis.

32. An arrangement as set forth in claim 27, including means for controlling temperature of the light tunnel.

33. An arrangement as set forth in claim 32, wherein the light tunnel is hollow, and the means for controlling tmeperature includes gas flow through the hollow tunnel.

34. An arrangement as set forth in claim 32, wherein the means for controlling temperature includes a thermal conveyance component in contact with the light tunnel at one portion of the thermal conveyance component for absorption of heat from the light tunnel and for transmitting the heat to another portion of the thermal conveyance component.

35. An arrangement as set forth in claim 27, including means for controlling alignment between the light tunnel and the rotatable unit.

36. An arrangement as set forth in claim 27, wherein the source is rigidly attached to the drive unit.

37. A light beam preparation arrangement for preparing a light beam as the beam proceeds along a stream path from a source toward utilization, the arrangement including:
   a light tunnel, downstream of the source, receiving the light beam at an input end of the tunnel and transforming the light beam to have a desired intensity distribution at an output end of the tunnel;
   a rotatable unit, in the light stream path with the beam impinging thereon, having a plurality of portions, each portion having a different optical characteristic, the rotatable unit being spaced a distance from the output end of the light tunnel;
   a drive unit rotating the rotatable unit; and
   means for controlling alignment between the light tunnel and the rotatable unit.

38. An arrangement as set forth in claim 37, wherein the means for controlling alignment includes means for rigidly attaching the light tunnel directly to the drive unit.

39. An arrangement as set forth in claim 37, wherein the rotatable unit is downstream of the light tunnel, and the means for controlling alignment includes means for controlling distance between the output end of the light tunnel and the rotatable unit via the use of a flowing gas.

40. An arrangement as set forth in claim 37, including a fixation rigidly attaching the light tunnel directly to the drive unit.

41. An arrangement as set forth in claim 40, including a housing, wherein the light tunnel has an axis, and the fixation is attached to the housing at a plurality of locations about the axis.

42. An arrangement as set forth in claim 41, wherein the plurality of attachment locations are each located at a common radial distance from the axis.

43. An arrangement as set forth in claim 40, wherein the rotatable unit is downstream of the light tunnel, and the arrangement includes means for controlling the distance between the output end of the light tunnel and the rotatable unit.

44. An arrangement as set forth in claim 43, wherein the means for controlling the distance includes a flowing gas.

45. An arrangement as set forth in claim 37, including means for controlling temperature of the light tunnel.

46. An arrangement as set forth in claim 45, wherein the light tunnel is hollow, and the means for controlling temperature includes gas flow through the hollow tunnel.

47. An arrangement as set forth in claim 45, wherein the means for controlling temperature includes a thermal conveyance component in contact with the light tunnel at one portion of the thermal conveyance component for absorption of heat from the light tunnel and for transmitting the heat to another portion of the thermal conveyance component.

48. An arrangement as set forth in claim 37, wherein the source is rigidly attached to the drive unit.

49. A light beam preparation arrangement for preparing a light beam as the beam proceeds along a stream path from a source toward utilization, the arrangement including:
a hollow light tunnel, downstream of the source, receiving the light beam at an input end of the tunnel and transforming the light beam to have a desired intensity distribution at an output end of the tunnel;
a rotatable unit, in the light stream path with the beam impinging thereon, having a plurality of portions, each portion having a different optical characteristic;
a drive unit rotating the rotatable unit; and
a gas flow though the light tunnel.

50. An arrangement as set forth in claim 49, including a fixation rigidly attaching the light tunnel directly to the drive unit.

51. An arrangement as set forth in claim 50, including a housing, wherein the light tunnel has an axis, and the fixation is attached to the housing at a plurality of locations about the axis.

52. An arrangement as set forth in claim 51, wherein the plurality of attachement locations are each located at a common radial distance from the axis.

53. An arrangement as set forth in claim 49, wherein the source is rigidly attached to the drive unit.

* * * * *

UNITED STATES PATENT AND TRADEMARK OFFICE
CERTIFICATE OF CORRECTION

| | |
|---|---|
| PATENT NO. | : 7,046,897 B2 |
| APPLICATION NO. | : 10/459077 |
| DATED | : May 16, 2006 |
| INVENTOR(S) | : Joe Haggerty et al. |

Page 1 of 1

It is certified that error appears in the above-identified patent and that said Letters Patent is hereby corrected as shown below:

In column 11, claim 16, line 33, delete "downstream of the light tunnel" and insert --in the light stream path--

In column 13, claim 43, line 16, delete "40" and insert --37--

Signed and Sealed this

Sixth Day of March, 2007

JON W. DUDAS
*Director of the United States Patent and Trademark Office*